(12) United States Patent
McFarland (10) Patent No.: US 7,609,157 B2
(45) Date of Patent: Oct. 27, 2009

(54) ANTENNA PROXIMITY DETERMINING SYSTEM UTILIZING BIT ERROR RATE

(75) Inventor: Scott A. McFarland, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 252 days.

(21) Appl. No.: 11/841,051

(22) Filed: Aug. 20, 2007

(65) Prior Publication Data

US 2009/0051547 A1    Feb. 26, 2009

(51) Int. Cl.
*G08B 1/08* (2006.01)
(52) U.S. Cl. ............................... 340/539.13; 340/573.1; 340/539.1; 340/539.11; 340/573.3; 340/693.1
(58) Field of Classification Search ............... 340/573.1, 340/539.1, 539.11, 573.3, 693.1
See application file for complete search history.

(56) References Cited

U.S. PATENT DOCUMENTS

| | | | | |
|---|---|---|---|---|
| 4,854,328 A | * | 8/1989 | Pollack | 600/549 |
| 5,610,588 A | * | 3/1997 | Yarnall et al. | 340/573.3 |
| 2004/0021574 A1 | | 2/2004 | Frankewich, Jr. | |
| 2004/0094355 A1 | | 5/2004 | Goorevich et al. | |
| 2007/0181078 A1 | | 8/2007 | McFarland | |

* cited by examiner

*Primary Examiner*—Daryl Pope
(74) *Attorney, Agent, or Firm*—Pitts & Brittian, P.C.

(57) ABSTRACT

Described is an antenna proximity determining system for determining the location of an animal with respect to a transmitting antenna utilizing the bit error rate corresponding to a signal transmitted by the transmitting antenna and received by a receiver unit carried by the animal and for delivering a stimulus to the animal based on its location with respect to the antenna.

51 Claims, 8 Drawing Sheets

ANTENNA PROXIMITY DETERMINING SYSTEM UTILIZING BIT ERROR RATE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention pertains to a system for wirelessly containing or excluding an animal. More particularly, this invention pertains to a system for delivering a stimulus to the animal based on the animal's location with respect to a containment boundary or an exclusion boundary.

BRIEF SUMMARY OF THE INVENTION

In accordance with the various features of the present invention there is provided an antenna proximity determining system for determining the location of an animal with respect to a transmitting antenna utilizing the bit error rate corresponding to a signal transmitted by the transmitting antenna and received by a receiver carried by the animal and for delivering a stimulus to the animal based on its location with respect to the antenna. The antenna proximity determining system includes a transmitter unit and a receiver unit. The transmitter unit includes a transmitting antenna and transmits a signal that is an attenuating magnetic field that radiates from the transmitting antenna that is a component of the transmitter unit. The signal includes at least one data word encoded using forward error correction coding. The receiver unit is carried by the animal and receives the signal transmitted by the transmitter unit. The receiver unit decodes the at least one encoded data word included by the signal and calculates the bit error rate corresponding to the received signal. Because the bit error rate of the received signal increases as the distance between the receiver unit and the transmitting antenna increases, the receiver unit determines the location of the animal with respect to the transmitting antenna based on the calculated bit error rate.

The antenna proximity determining system operates in a containment mode of operation and an exclusion mode of operation. When the system is operating in the containment mode, the transmitting antenna defines a containment boundary, within which the animal is contained. The receiver unit delivers a stimulus to the animal when the receiver unit determines that its location with respect to the transmitting antenna indicates that the animal is approaching the containment boundary, encouraging the animal to remain within the containment boundary. When the system is operating in the exclusion mode, the transmitting antenna defines an exclusion boundary, from which the animal is excluded. The receiver unit delivers a stimulus to the animal when the receiver unit determines that its location with respect to the transmitting antenna indicates that the animal is approaching the exclusion boundary, encouraging the animal to stay away from the area within the exclusion boundary.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention provides an antenna proximity determining system for containing an animal within or excluding an animal from a defined area. The antenna proximity determining system defines a plurality of zones and determines which of the plurality of zones the animal is within based on the bit error rate of a signal received at the current location of the animal. The antenna proximity determining system delivers a stimulus to the animal based on the zone the animal is within. One embodiment of the antenna proximity determining system constructed in accordance with the various features of the present invention is illustrated generally at 10 in FIG. 1.

Figure 1:
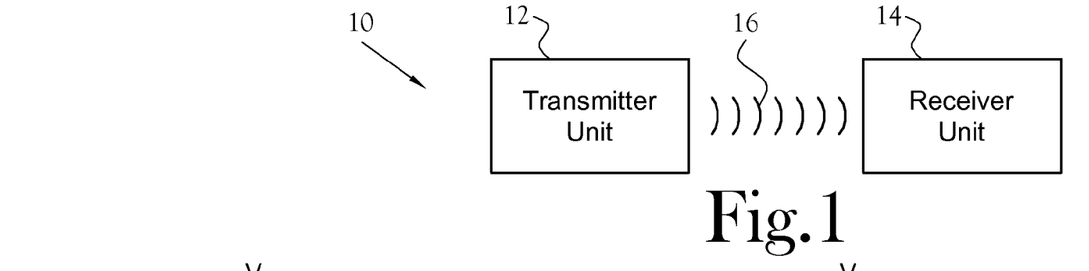
FIG. 1 illustrates one embodiment of the antenna proximity determining system.
Figure 2:
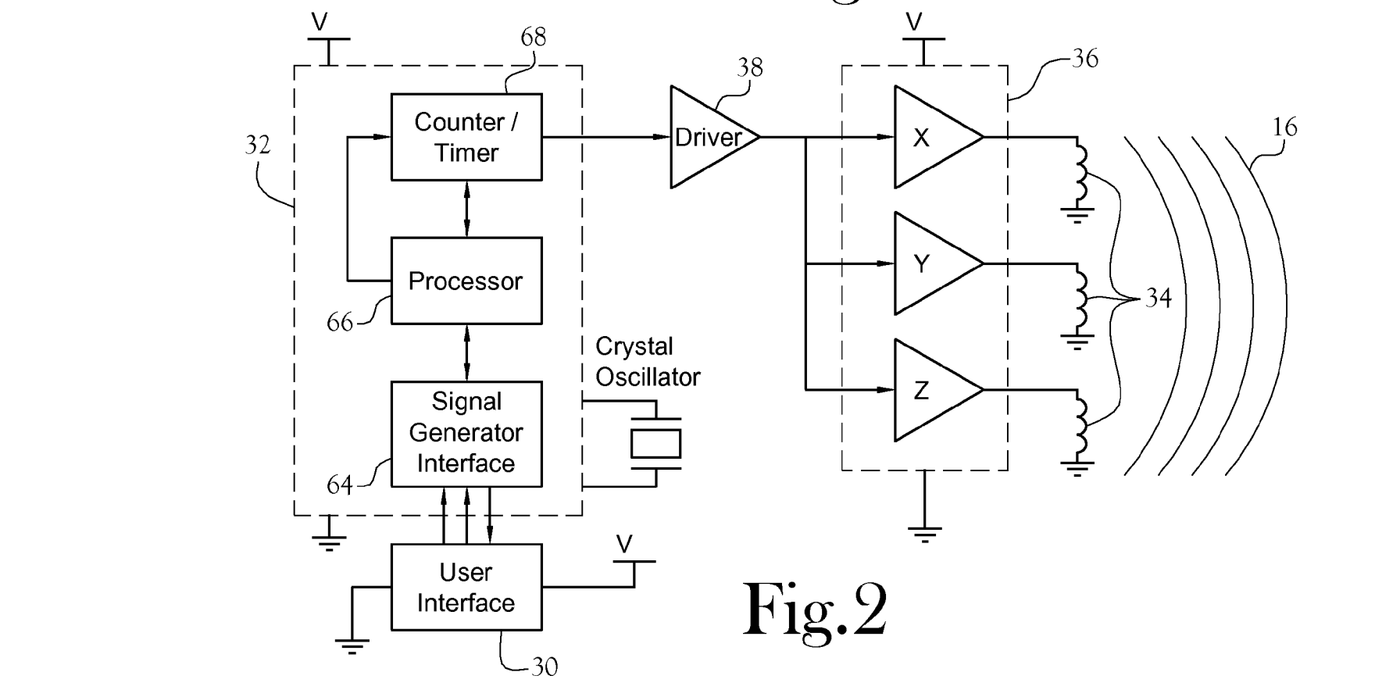
FIG. 2 is a block diagram of one embodiment of the transmitter unit of the antenna proximity determining system.

FIG. 1 illustrates a block diagram of one embodiment of the antenna proximity determining system 10 in accordance with the various features of the present invention. The antenna proximity determining system 10 includes a transmitter unit 12 and a receiver unit 14. The transmitter unit 12 generates and wirelessly transmits a digital signal 16 that is received by the receiver unit 14 such that the transmitter unit 12 and the receiver unit 14 are in wireless communication. FIG. 2 is a block diagram of one embodiment of the transmitter unit 12 in accordance with the various features of the present invention. In the illustrated embodiment, the transmitter unit 12 includes a user interface 30 that permits the user of the antenna proximity determining system 10 to, for example, select the desired correction scheme or one of the subsequently discussed modes of operation of the antenna proximity determining system 10. The user interface 30 in is electrical communication with a signal generator 32, which includes a signal generator interface 64, a processor 66, and a counter/timer 68. The signal generator 32 generates and modulates the signal 16. In the discussed embodiment, the signal 16 is frequency modulated using frequency-shift keying (FSK). The signal generator 32 is in electrical communication with a transmitting antenna 34 by way of a driver 38 and a power amplifier 36. The driver 38 receives the modulated signal 16 from the signal generator 32, buffers the signal 16, and forwards the signal 16 to the power amplifier 36, which amplifies the signal 16. A transmitting antenna 34 receives the amplified signal 16 from the power amplifier 36 and wirelessly transmits the signal 16. In one embodiment, the transmitting unit 12 transmits the signal 16 at 10 kHz with a FSK deviation of ±300 Hz. In the illustrated embodiment, the transmitting antenna 34 is a three-coil antenna array having a x-coil, a y-coil, and a z-coil. Accordingly, the power amplifier 36 of the illustrated embodiment includes three separate power amplifiers 36, a power amplifier 36 corresponding to each coil of the transmitting antenna 34.

Figure 3:
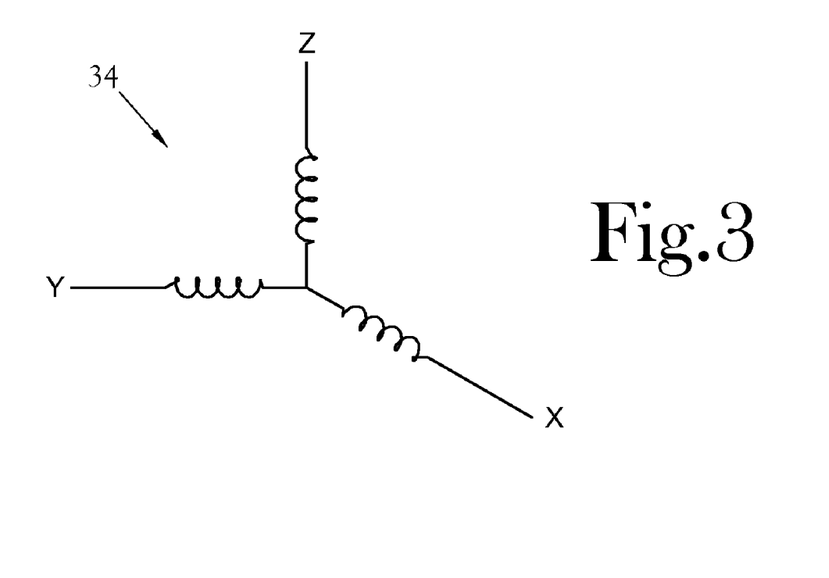
FIG. 3 illustrates one embodiment of the transmitting antenna of the transmitter unit.

FIG. 3 is a more specific illustration of one embodiment of the transmitting antenna 34 of FIG. 2 in accordance with the various features of the present invention. In the illustrated embodiment, the transmitting antenna 34 is a three-coil antenna array, whereby the three coils are mutually orthogonal. It should be noted that the transmitting antenna 34 can be a structure other than a three-coil antenna array without departing from the scope or spirit of the present invention. For example, the transmitting antenna 34 can be a single wire, buried or placed on the ground, that defines a containment or exclusion boundary. It should also be noted that while one specific embodiment of the transmitter unit 12 is described and illustrated above, the components, shown and not shown, of the transmitter unit 12 can vary without departing from the scope or spirit of the present invention.

Figure 4A:
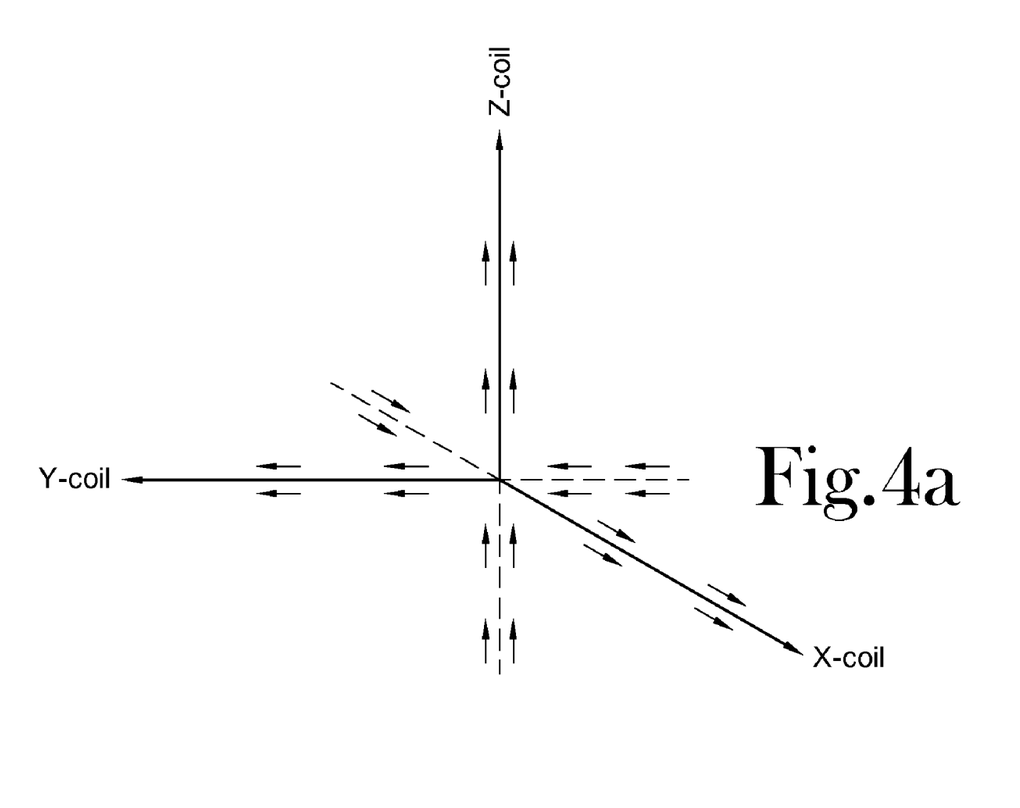
FIG. 4a depicts the respective directions of the various currents flowing through the various coils of the transmitting antenna illustrated at FIG. 3.
Figure 4B:
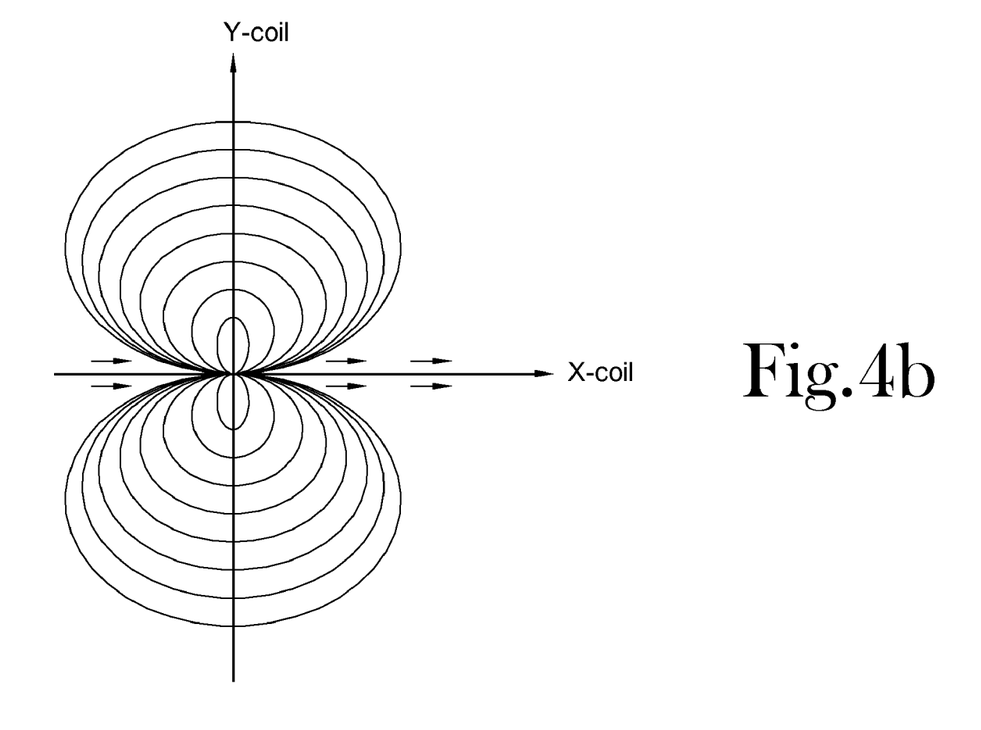
FIG. 4b illustrates the magnetic field generated by the x-coil of the transmitting antenna of FIG. 3.
Figure 4C:
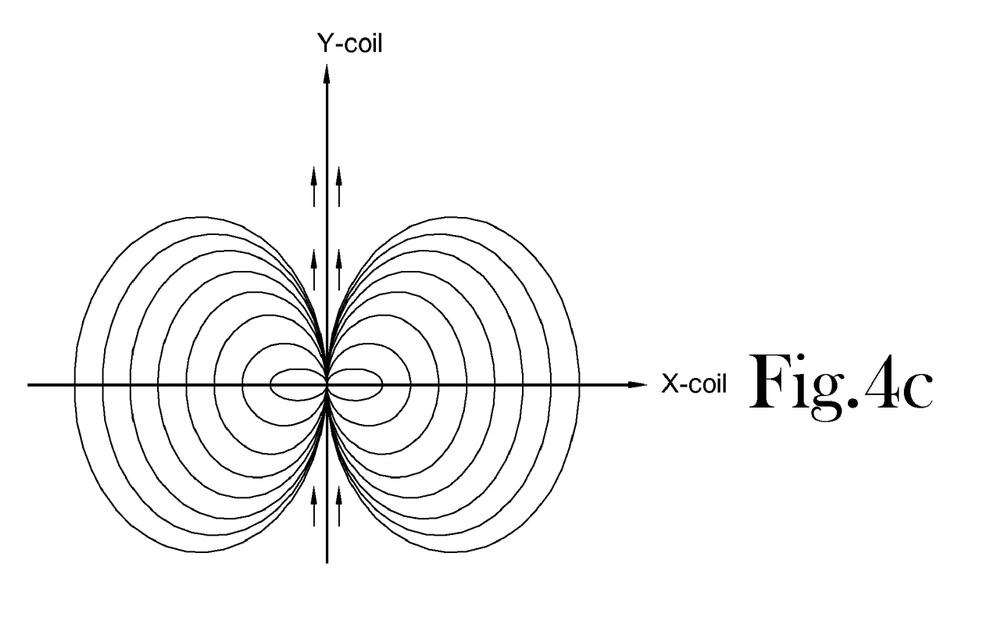
FIG. 4c illustrates the magnetic field generated by the y-coil of the transmitting antenna of FIG. 3.
Figure 4D:
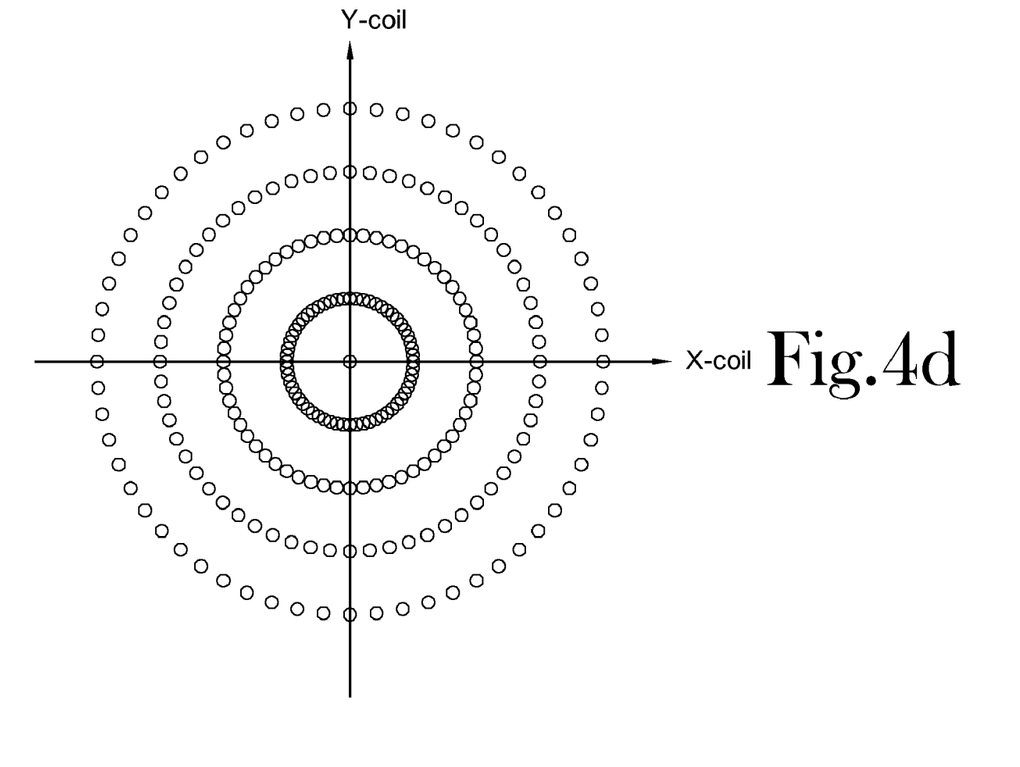
FIG. 4d illustrates the magnetic field generated by the z-coil of the transmitting antenna of FIG. 3.

The signal 16 is an attenuating magnetic field that radiates from the transmitting antenna 34 of the transmitter unit 12. FIG. 4a depicts the direction of the current pushed through the x-coil, the y-coil, and the z-coil of the transmitting antenna 34 of FIG. 3 to generate the magnetic field that is the signal 16. FIG. 4b depicts the magnetic field generated by the x-coil from the perspective along the axis of the z-coil. FIG. 4c depicts the magnetic field generated by the y-coil from the perspective along the axis of the z-coil. And FIG. 4d depicts the magnetic field generated by the z-coil from the perspective along the z-coil. It should be noted that the magnetic fields generated by the x-coil, the y-coil, and the z-coil are substantially the same such that the magnetic field generated by the transmitting antenna 34 of FIG. 3 attenuates uniformly in all directions from the transmitting antenna 34.

Figure 5:
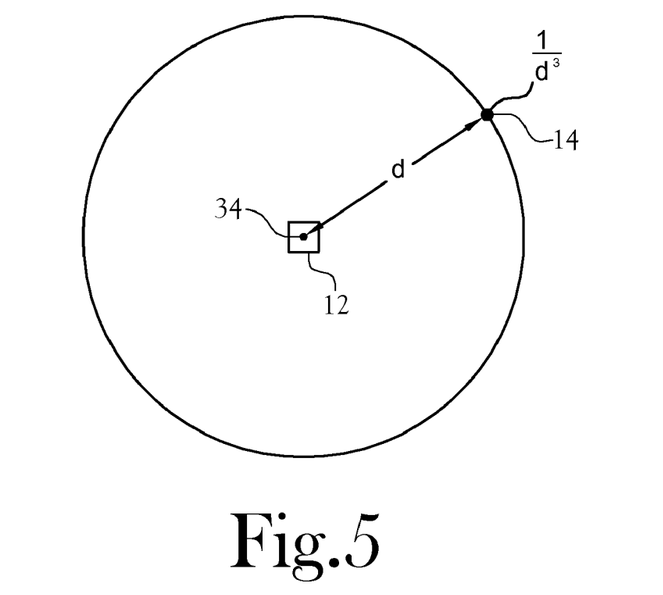
FIG. 5 illustrates the rate of attenuation of the signal transmitted by one embodiment of the transmitting antenna having an array of coils.
Figure 6:
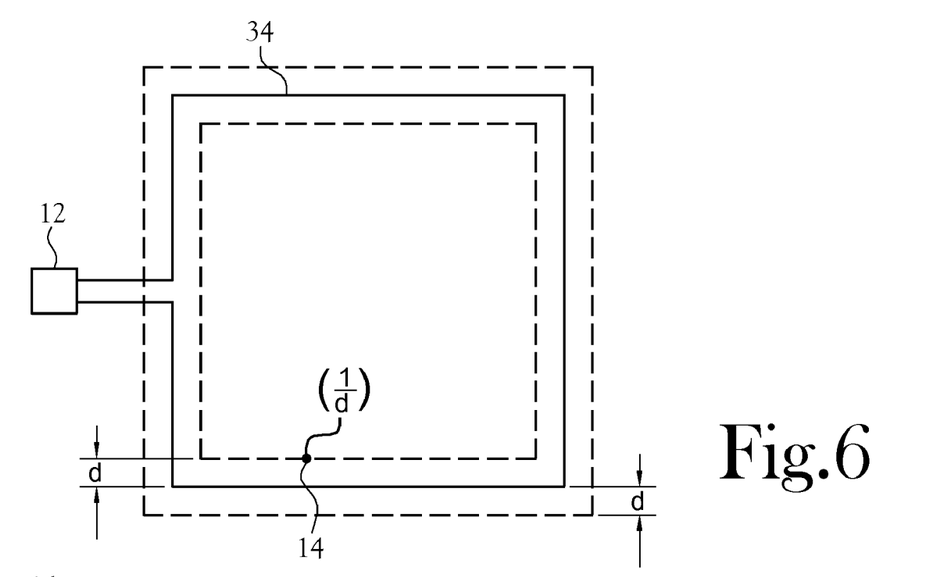
FIG. 6 illustrates the rate of attenuation of the signal transmitted by one embodiment of the transmitting antenna having a single wire.

When the transmitting antenna 34 is the three-coil antenna array of FIG. 3, the strength of the signal 16 at a distance (d) from the transmitting antenna 34 is proportional to $1/d^3$. Consequently, when the receiver unit 14 is a distance (d) from the transmitting antenna 34, as is illustrated at FIG. 5, the strength of the signal 16 at the receiver unit 14 is proportional to $1/d^3$. When the transmitting antenna 34 is a single wire, as illustrated at FIG. 6, the strength of the signal 16 at a distance (d) from the transmitting antenna 34 is proportional to $1/d$. Consequently, when the receiver unit 14 is a distance (d) from the transmitting antenna 34, as is illustrated at FIG. 6, the strength of the signal 16 at the receiver unit 14 is proportional to $1/d$. Because the signal 16 is an attenuating magnetic field, it is highly immune to variations in field strength that occur when using propagating electromagnetic waves, and its signal strength at a distance (d) from the transmitting antenna 34 is remarkably uniform in accordance with the above equations. Considering the above equations, the strength of the signal 16 at the receiver unit 14 decreases as the distance (d) between the transmitting antenna 34 and receiver unit 14 increases. Additionally, because the signal-to-noise ratio at the receiver unit 14 decreases as the strength of the signal 16 at the receiver unit 14 decreases, the signal-to-noise ratio at the receiver unit 14 decreases as the distance between the transmitting antenna 34 and the receiver unit 14 increases. Additionally, for a given data transmission rate (bits transmitted/time), the bit error rate (bit errors/bits transmitted) at the receiver unit 14 increases as the signal-to-noise ratio decreases. As a result, for a given data transmission rate, the bit error rate at the receiver unit 14 increases as the distance between the receiver unit 14 and the transmitting antenna 34 increases. Consequently, the bit error rate at the receiver unit 14 indicates the distance between the receiver unit 14 and the transmitting antenna 34. Additionally, for a given signal-to-noise ratio, the bit error rate at the receiver unit 14 increases as the data transmission rate of the signal 16 increases. Consequently, the bit error rate at the receiver unit 14 considered in conjunction with the data transmission rate of the signal 16 indicates the distance between the receiver unit 14 and the transmitting antenna 34.

Figure 7:
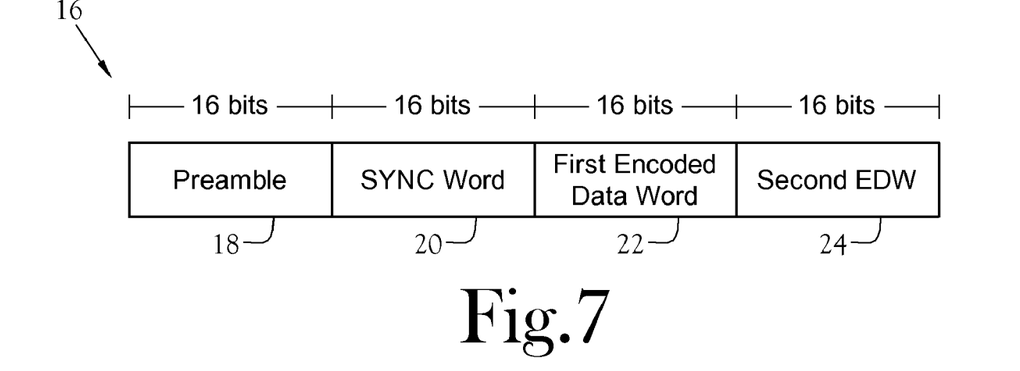
FIG. 7 depicts one embodiment of the structure of the signal generated and transmitted by the transmitter unit.

FIG. 7 illustrates one embodiment of the structure of the signal 16 in accordance with the various features of the present invention. The signal 16 includes a structured synchronous data protocol that, in the illustrated embodiment, includes a preamble 18, a sync word 20, a first encoded data word 22, and a second encoded data word 24. In one embodiment, the preamble 18 is a 16-bit word of alternating ones and zeroes that is transmitted at a low data transmission rate. In the illustrated embodiment, the preamble 18 is immediately followed by the sync word 20. In one embodiment, the sync word 20 is a 16-bit word that establishes communication between the transmitter unit 12 and the receiver unit 14 as subsequently discussed. In accordance with the function of establishing communication between the transmitter unit 12 and the receiver unit 14, one embodiment of the sync word 20 is a set of bits of a low cross-correlation bit pattern. The sync word 20 is unique, is predefined, and indicates to the receiver unit 14 the desired operation of the receiver unit 14. For example, the sync word 20 indicates the desired mode of operation of the antenna proximity determining system 10 and the current stimulus scheme, including the type and intensity of the delivered stimulus. The sync word 20 also indicates the data transmission rates at which the encoded data words 22 and 24 are transmitted. Similar to the preamble 18, the sync word 20 is transmitted at the low data transmission rate. In the illustrated embodiment, the sync word 20 is immediately followed by the first encoded data word 22. The first encoded data word 22 is a 16-bit forward error correction (FEC) encoded data word transmitted at the low data transmission rate. In the illustrated embodiment, the first encoded data word 22 is immediately followed by the second encoded data word 24. The second encoded data word 24 is a 16-bit FEC encoded data word transmitted at a high data transmission rate; the high data transmission rate being a faster data transmission rate (more bits-per-second) than the low data transmission rate.

In one embodiment, the encoded data words 22 and 24 are FEC encoded utilizing the Bose-Chaudhuri-Hocquenghem (15,7,1) encoding method ("the BCH encoding method"). The BCH encoding method encodes 7 data bits into a 15 bit FEC codeword in accordance with a BCH encoding algorithm. Encoding a data word using the BCH encoding method permits up to two bit errors to be corrected when the data word is decoded. It should be noted that when bit errors are corrected, the number of corrections, and incidentally the number of bit errors, are determined. Stated differently, when the data word is decoded, the number of bit errors is detected. Consequently, the bit error rate corresponding to a transmitted data word is calculated when the data word is decoded. It should be noted that the bit error rate can be calculated over the transmission of a single signal 16 or over a period of time that encompasses the transmission of multiple signals 16.

Figure 8:
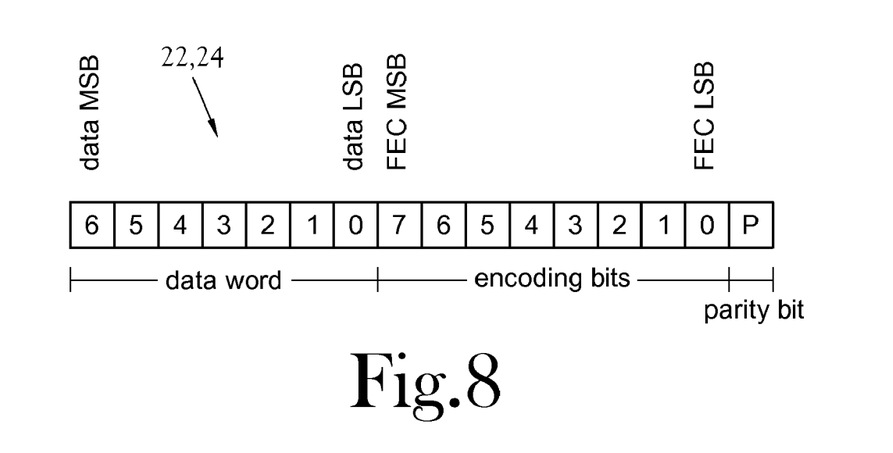
FIG. 8 depicts one embodiment of the structure of an encoded data word of the signal generated by the transmitter unit.

It should be noted that the BCH encoding method generates a 15-bit word, whereas the encoded data words 22 and 24 are 16-bit words. The sixteenth bit of each of the encoded data words 22 and 24 of the illustrated embodiment is a parity bit to create an overall odd parity. Accordingly, when either the first encoded data word 22 or the second encoded data word 24 is decoded using a BCH decoding algorithm, the overall parity of the decoded word is compared against the parity created by the parity bit. When the parity of the decoded data word is that created by the parity bit, it is determined that the received encoded data word includes the number of bit errors detected by the decoding of the data word. When the parity of the decoded data word is not that created by the parity bit, it is determined that the received encoded data word includes at least three (3) bit errors. It should be noted that when an encoding method that corrects a number of bit errors other than two (2) bit errors is used, the parity bit can indicate that the received encoded data word includes a number of bit errors other than at least three (3) bit errors. It should also be noted that the parity bit can create a parity other than an overall odd parity without departing from the scope and spirit of the present invention. FIG. 8 illustrates one embodiment of the structure of the 16-bit encoded data words 22 and 24 in accordance with the various features of the present invention.

It should be noted that the signal 16 can include structures other than the above-described structure without departing from the scope or spirit of the present invention. For example, the preamble 18, the sync word 20, the first encoded data word 22, and the second encoded data word 24 can include more or less than 16 bits. Additionally, the encoded data words 22 and 24 can vary in number and transmission data rates. For example, one embodiment of the signal 16 includes three encoded data words, each being transmitted at a different data transmission rate. Another embodiment includes four encoded data words, the first two encoded data words being transmitted at the low data transmission rate and the last two encoded data words being transmitted at the high data transmission rate. Another embodiment includes only one encoded data word transmitted at a single data transmission rate. It should also be noted that the encoded data words can be encoded by methods other than the BCH encoding method without departing from the scope or spirit of the present invention. Additionally, it should be noted that the signal 16 can be modulated using methods other than FSK without departing from the scope or spirit of the present invention. It should also be noted that the signal 16 can be transmitted at a frequency other than 10 kHz without departing from the scope or spirit of the present invention.

Figure 9:
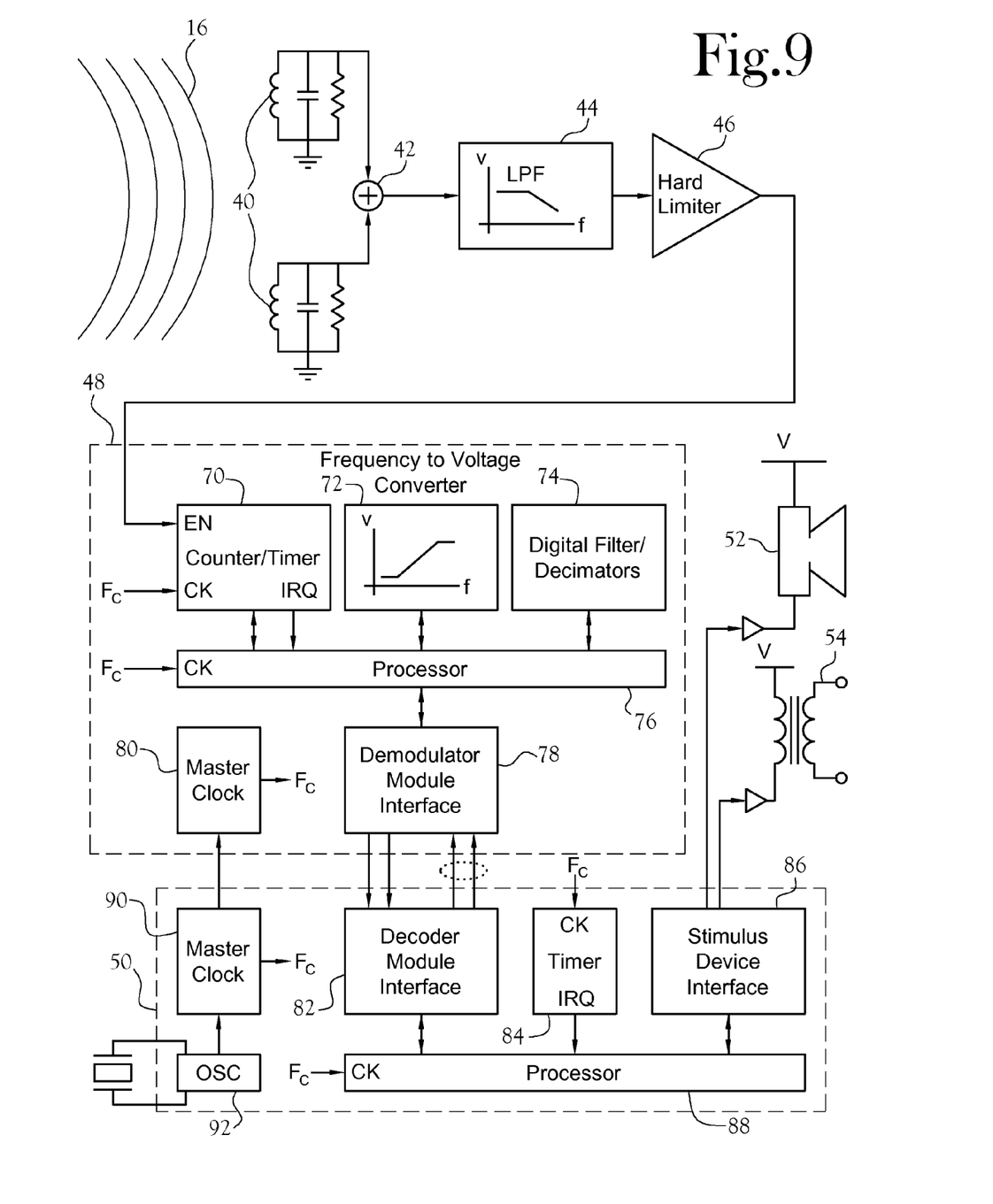
FIG. 9 is a block diagram of one embodiment the receiver unit of the antenna proximity determining system.

FIG. 9 is a block diagram of one embodiment of the receiver unit 14 in accordance with the various features of the present invention. The receiver unit 14 is carried by an animal and includes a receiving antenna 40 that is responsive to the signal 16. In the illustrated embodiment, the receiving antenna 40 is a two-coil antenna array that is responsive to the signal 16. More specifically, the two coils of the receiving antenna 40 are orthogonal and oriented such that one coil is positioned for maximum vertical field detection and the other coil is positioned for maximum horizontal field detection. Additionally, the receiving antenna 40 is responsive to the signal 16 in that the magnetic field that is the signal 16 induces a voltage across the receiving antenna 40 due to the near field magnetic coupling between the transmitting antenna 34 and the receiving antenna 40 to the extent that the receiving antenna 40 receives the signal 16. The outputs of the coils of the receiver antenna 40 are summed by the summing circuit 42. The signal 16 is then processed by a low pass filter 44 and a hard limiter 46 to remove any unnecessary amplitude components of the signal 16. The hard limiter 46 is in electrical communication with a demodulator module 48 such that the demodulator module 48 receives the signal 16. The demodulator module 48 of the illustrated embodiment includes a counter/timer 70, a frequency-to-voltage converter 72, a digital filter/decimator 74, a processor 76, a demodulator module interface 78, and a demodulator module master clock 80. The demodulator module 48 demodulates the modulated signal 16. More specifically, the demodulator module 48 of the illustrated embodiment is a frequency-to-voltage converter. The demodulator module 48 is in electrical communication with a decoder module 50 such that the decoder module 50 receives the demodulated signal 16. The decoder module 50 of the illustrated embodiment includes a decoder module interface 82, a timer 84, a stimulus device interface 86, a processor 88, a decoder module master clock 90, and an oscillator 92.

The decoder module 50 samples the output of the demodulator module 48 at a regular interval. When consistent positive going edges at the low data transmission rate are detected, a bit cell integration process commences. More specifically, each bit cell is individually integrated over its entire cell width to determine its value, namely "1" or "0". The value is placed into a 16-bit serial shift register. After each value is placed into the shift register, the values within the register are compared against one or more valid sync words. When a valid sync word is detected within the register, the sync word 20 is received by the decoder module 50. As previously discussed, the predefined sync word 20 indicates the data transmission rate at which the following encoded data words are transmitted such that the decoder module 50 properly receives the encoded data words. In accordance with the discussed embodiment, the sync word 20 indicates to the decoder module 50 that the first encoded data word 22 is transmitted at the low data transmission rate and the second encoded data word 24 is transmitted at the high data transmission rate. When the sync word 20 is received, the sync word boundary is noted such that the following encoded data words 22 and 24 can be received. More specifically, when the sync word 20 is received, the last bit of the sync word 20, namely the sync word boundary, is noted such that the following 16 bits are received as the first encoded data word 22. Additionally, when the last bit of the sync word 20 is noted, the decoder module 50 receives the following 16 bits at the low data transmission rate. Similarly, when the first encoded data word 22 is received, the last bit of the first encoded data word 22, namely the first encoded data word boundary, is noted such that the following 16 bits are received as the second encoded data word 24. Additionally, when the last bit of the first encoded data word 22 is noted, the decoder module 50 receives the following 16 bits at the high data transmission rate.

After the decoder module 50 receives the sync word 20, the first encoded data word 22, and the second encoded data word 24, the decoder module 50 decodes the encoded data words 22 and 24. More specifically, in accordance with the discussed embodiment, the decoder module 50 utilizes decoding algorithms corresponding to the BCH encoding method to decode the encoded data words 22 and 24. After decoding the encoded data words 22 and 24, the decoder module 50 calculates the bit error rate associated with the first encoded data word 22, which is transmitted at the low data transmission rate, and the bit error rate associated with the second encoded data word 24, which is transmitted at the high data transmission rate.

It should be noted that while one specific embodiment of the receiver unit 14 is described and illustrated above, the components, shown and not shown, of the receiver unit 14 can vary without departing from the scope or spirit of the present invention.

The decoder module 50 is in electrical communication with a stimulus generator that generates and delivers a warning or correction stimulus to the animal. In the illustrated embodiment, the decoder module 50 is in electrical communication with an audible stimulus generator 52 and an electrical stimulus generator 54. Additionally, as previously mentioned, the predefined sync word 20 indicates information regarding the current mode of operation and the stimulus scheme of the antenna proximity determining system 10. The decoder module 50 considers the information regarding the current mode of operation and the stimulus scheme, the bit error rate associated with the first encoded data word 22, and the bit error rate associated with the second encoded data word 24 and activates the audible stimulus generator 52 or the electrical stimulus generator 54 in accordance with the current mode of operation and stimulus scheme.

Figure 10:
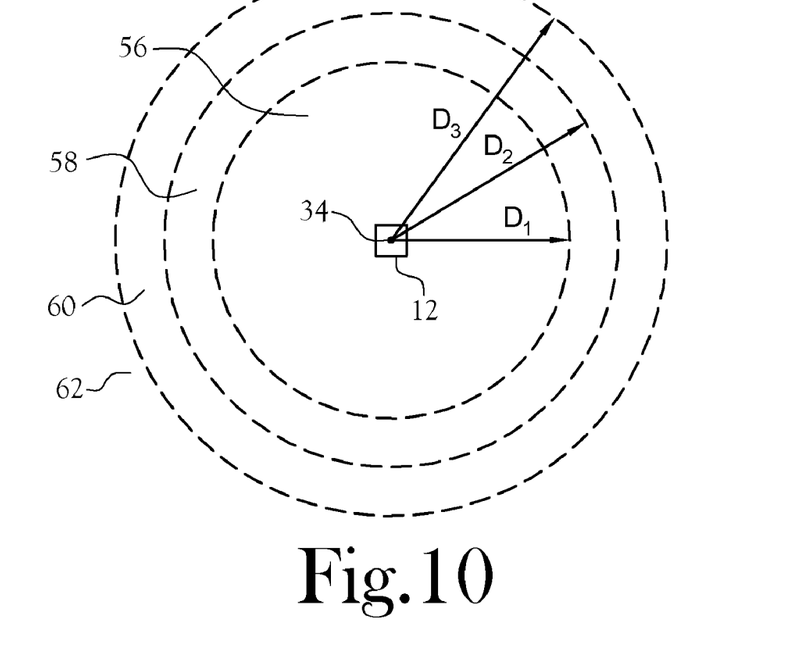
FIG. 10 illustrates the containment and exclusion features of the antenna proximity determining system provided by one embodiment of the transmitting antenna having an array of coils.

FIG. 10 illustrates four zones defined by one embodiment of the antenna proximity determining system 10, whereby the transmitting antenna 34 is the three-coil antenna array illustrated at FIG. 3. More specifically, the antenna proximity determining system 10 defines a first zone 56, a second zone 58, a third zone 60, and a fourth zone 62. The four zones are defined by distances $D_1$, $D_2$, and $D_3$ from the transmitting antenna 34. More specifically, the first zone 56 is the area less than distance $D_1$ from the transmitting antenna 34; the second zone 58 is the area between distance $D_1$ and distance $D_2$ from the transmitting antenna 34; the third zone 60 is the area between distance $D_2$ and distance $D_3$ from the transmitting antenna 34; and the fourth zone 62 is the area greater than distance $D_3$ from the transmitting antenna 34. Distance $D_3$ is greater than distance $D_2$, which is greater than distance $D_1$.

In accordance with the above discussion, when the receiver unit 14 is within the first zone 56 and receives the signal 16, the first encoded data word 22 is decoded with a bit error rate of zero, and the second encoded data word 24 is decoded with a bit error rate of zero. When the receiver unit 14 is within the second zone 58 and receives the signal 16, the first encoded data word 22 is decoded with a bit error rate of zero, but because the second encoded data word 24 is transmitted at the high data transmission rate, the second encoded data word 24 is decoded with a bit error rate that is greater than zero. When the receiver unit 14 is within the third zone 60 and receives the signal 16, both the first encoded data word 22 and the second encoded data word 24 are decoded with a bit error rate that is greater than zero. When the receiver unit 14 is within the fourth zone 62, the signal 16 is not strong enough to be detected and received by the receiver unit 14.

It should be noted that distances $D_1$-$D_3$, and incidentally the zones 56-62, can be defined and adjusted by increasing and decreasing the data transmission rates of the encoded data words 22 and 24. Additionally, it should be noted that more or less data transmission rates can be used to generate the desired number of zones. For example, transmitting three encoded data words, each at a different data transmission rate, defines five zones. Additionally, transmitting one encoded data word at one data transmission rate defines three zones.

The antenna proximity determining system 10 operates in a containment mode of operation and an exclusion mode of operation, and, as previously discussed, the receiver unit 14 is carried by the animal. When the antenna proximity determining system 10 operates in the containment mode of operation and the decoder module 50 decodes the first encoded data word 22 at a bit error rate of zero and decodes the second encoded data word 24 at a bit error rate of zero, the decoder module 50 determines that the animal is within the first zone 56 and does not activate the audible stimulus generator 52 or the electrical stimulus generator 54. When the decoder module 50 decodes the first encoded data word 22 at a bit error rate of zero but decodes the second encoded data word 24 at a bit error rate of greater than zero, the decoder module 50 determines that the animal is within the second zone 58 and activates the audible stimulus generator 52, which delivers an audible stimulus to the animal, warning the animal to return to the first zone 56. When the decoder module 50 decodes both the first encoded data word 22 and the second encoded data word 24 at a bit error rate of greater than zero, the decoder module 50 determines that the animal is within the third zone 60 and activates the electrical stimulus generator 54, which delivers an electrical stimulus to the animal, correcting the animal for being greater than a distance $D_2$ from the transmitting antenna 34. When the receiver unit 14 does not detect the signal 16, it determines that the animal is within the fourth zone 62 and does not active the audible stimulus generator 52 or the electrical stimulus generator 54. Stated differently, a detectable signal 16 is required for the receiver unit 14 to deliver a stimulus to the animal.

The decoder module 50 does not activate a stimulus generator when it determines that the animal is within the fourth zone 62 because the decoder module 50 determines that the animal has strayed beyond the outermost boundary of the antenna proximity determining system 10. Delivering a continuous stimulus to the animal when it is beyond the outermost boundary would likely confuse the animal and induce unnecessary stress on the animal. Consequently, in one embodiment, when the animal has been within the fourth zone 62, the decoder module 50 does not resume operation as discussed above until the decoder module 50 determines that the animal has returned to the first zone 56. This feature of the antenna proximity determining system 10 also acts as a fail safe mechanism. More specifically, if the transmitter unit 12 fails such that the transmitter unit 12 does not transmit the signal 16 for the receiver unit 14 to detect, the receiver unit 16 does not deliver a stimulus to the animal until the transmitter unit 12 is revived and the receiver unit 14 determines that the animal is within the first zone 56. Consequently, a stimulus is not continuously delivered to the animal when the transmitter unit 12 fails.

When the antenna proximity determining system 10 operates in the containment mode of operation, the system can be deployed such that the first zone 56 defines, for example, a yard within which the animal is contained. The second zone 58 defines the outer boundary of the yard such that when the animal approaches the boundary, the receiver unit 14 warns the animal to return to the yard. And the third zone 60 defines an area beyond the yard such that when the animal leaves the yard, the receiver unit 14 delivers a correction stimulus to the animal, encouraging the animal to return to the yard. To tailor the antenna proximity determining system 10 to properly fit a particular area, such as a yard, the distances $D_1$, $D_2$, and $D_3$ are defined by way of calculations. For example, the distance $D_1$ is desired to be 30 meters and the transmitting antenna 34 is a single coil antenna having a coil radius of 0.013 meters and transmits the signal 16 at 10 kHz with a FSK deviation of ±300 Hz. Additionally, the receiving antenna 40 is a single coil antenna having radius of 0.008 meters, 200 turns, and a loaded Q value (center frequency/bandwidth) of 16. The minimum signal level that the receiver unit 14 requires for detection with no bit errors is 20 μV. Considering the exemplary parameters defined above, the minimum magnetic field strength, namely the minimum required strength of the signal 16, that the receiver unit 14 requires to detect and receive the signal 16 with no bit errors is calculated considering the equation for the voltage induced across a coil antenna from a time varying magnetic field shown below.

$$V = 2\pi f N S B \cos(\alpha)$$

whereby, V is the voltage (v) induced across the antenna, f is the carrier frequency (Hz) of the signal 16, N is the number of turns of the receiving antenna 40, S is the surface area (m²) of the receiving antenna 40, B is strength (W/m²) of the signal 16, and α is the angle (radians) of the loop with respect to the direction of the signal 16. Inserting the parameters and calculating for B, the strength of the signal 16, shows that the strength of the signal 16 must be at least $4.95*10^{-10}$ W/m² for the receiving antenna 40 to detect the signal 16 with no bit errors.

After calculating the required strength of the signal 16, namely B, the required current driven through the transmitting loop antenna 34 to generate the required strength of signal 16 is calculated considering the exemplary parameters defined above and the equation for the magnetic field strength generated from a current carrying loop shown below.

$$i = \frac{2Bx^3}{N\mu_0 R^2}$$

whereby, B is the strength (W/m²) of the signal 16, $\mu_o = 4*10^{-7}$, N is the number of turns of the transmitting antenna 34, i is the current (A) driven through the transmitting antenna 34, R is the radius (m) of the of the transmitting antenna 34, and x is the distance from the transmitting antenna 34. Inserting the given parameters and the calculated B and calculating for Ni shows that 76.5 ampere-turns is required to generate a magnetic field strength of $B = 4.95*10^{-10}$ W/m² at 30 m from the transmitting antenna 34.

For the given FSK deviation of ±300 Hz, the bit error rate increases from $10^{-2}$ to $10^{-1}$ when the received power decreases by approximately 2 dB. Additionally, considering that the strength of the signal 16 at distance (d) from the transmitting antenna 34 for the current example is proportional to $1/d^3$, a 2 dB increase in received power corresponds to an 8% decrease in distance from the transmitting antenna 34, and a 2 dB decrease in received power corresponds to an 8% increase in distance from the transmitting antenna 34.

Consequently, when the distance $D_1$ is set to be 30 meters, the boundary between the first zone 56 and the second zone 58 is at 30 m±1.2 m.

For the current example, the high data transmission rate is defined to be twice that of the low data transmission rate. Consequently, at a particular distance from the transmitting antenna 34, the bit error rate for a signal transmitted at the low data transmission rate is equal to the bit error rate for a signal transmitted at the high data transmission rate when the power of the signal transmitted at the high data transmission rate is approximately 3 dB greater than the power of the signal transmitted at the low data transmission rate. A 3 dB change in signal power corresponds to a 12% change in distance. More specifically, in the current example, a 3 dB change in signal power corresponds to a change in distance of 3.6 meters. Consequently, the distance $D_2$, the distance at which a signal transmitted at the low data transmission rate transitions between having a bit error rate of $10^{-2}$ and a bit error rate of $10^{-1}$, is 3.6 m greater than $D_1$. Stated differently, the distance $D_2$ is 33.6 m±1.3 m. Additionally, an additional decrease in received power of 2 dB renders the distance at which a signal transmitted at the low data transmission rate transitions between being detectable by the receiver unit 14 and not being detectable by the receiver unit 14 to be 36.3 m+−1.45 m. Stated differently, the distance $D_3$ is 36.3 m±1.45 m.

When the antenna proximity determining system 10 of the illustrated embodiment operates in the exclusion mode of operation, the transmitting antenna 34 is positioned at an area from which the animal is to be excluded, such as a flower garden. Accordingly, when the decoder module 50 decodes both the first encoded data word 22 and the second encoded data word 24 at a bit error rate of greater than zero, the decoder module 50 determines that the animal is within the third zone 60 and does not activate the audible stimulus generator 52 or the electrical stimulus generator 54. When the decoder module 50 decodes the first encoded data word 22 at a bit error rate of zero but decodes the second encoded data word 24 at a bit error rate of greater than zero, the decoder module 50 determines that the animal is within the second zone 58 and activates the audible stimulus generator 52, which delivers an audible stimulus to the animal, warning the animal to return to the third zone 60. When the decoder module 50 decodes the first encoded data word 22 at a bit error rate of zero and decodes the second encoded data word 24 at a bit error rate of zero, the decoder module 50 determines that the animal is within the first zone 56 and activates the electrical stimulus generator 54, which delivers an electrical stimulus to the animal, correcting the animal for being less than a distance $D_1$ from the transmitting antenna 34, which is placed at, for example, the flower garden. Consequently, the antenna proximity determining system 10 discourages the animal from approaching the transmitting antenna 34 or, for example, the flower garden. The zones 56-62 and the distances $D_1$-$D_3$ are defined in accordance with the above-calculations.

Figure 11:
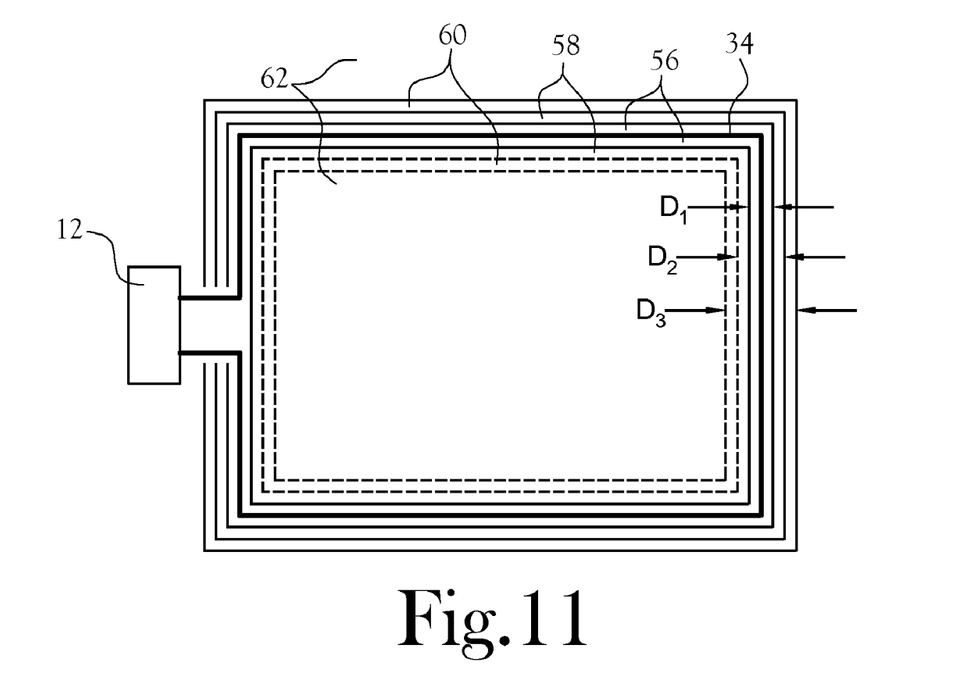
FIG. 11 illustrates the containment and exclusion features of the antenna proximity determining system provided by one embodiment of the transmitting antenna having a single wire.

FIG. 11 illustrates another embodiment of the antenna proximity determining system 10 in accordance with the various features of the present invention. In the illustrated embodiment, the transmitting antenna 34 is a single wire that defines a boundary. More specifically, similar to the embodiment where the transmitting antenna 34 is a three-coil antenna, the antenna proximity determining system 10 defines four zones, namely a first zone 56, a second zone 58, a third zone 60, and a fourth zone 62. The four zones are defined by distances from the transmitting antenna 34. More specifically, the first zone 56 is the area less than distance $D_1$ from the transmitting antenna 34; the second zone 58 is the area between distance $D_1$ and distance $D_2$ from the transmitting antenna 34; the third zone 60 is the area between distance $D_2$ and distance $D_3$ from the transmitting antenna 34; and the fourth zone 62 is the area greater than distance $D_3$ from the transmitting antenna 34.

In accordance with above discussion, when the receiver unit 14 is within the first zone 56 and receives the signal 16, the first encoded data word 22 is decoded with a bit error rate of zero, and the second encoded data word 24 is decoded with a bit error rate of zero. When the receiver unit 14 is within the second zone 58 and receives the signal 16, the first encoded data word 22 is decoded with a bit error rate of zero, but because the second encoded data word 24 is transmitted at the high data transmission rate, the second encoded data word 24 is decoded with a bit error rate that is greater than zero. When the receiver unit 14 is within the third zone 60 and receives the signal 16, both the first encoded data word 22 and the second encoded data word 24 are decoded with a bit error rate that is greater than zero. When the receiver unit 14 is within the fourth zone 62, the signal 16 is not strong enough to be detected and received by the receiver unit 14.

As previously discussed, the antenna proximity determining system 10 operates in a containment mode of operation and an exclusion mode of operation, and, as previously discussed, the receiver unit 14 is carried by the animal. When the antenna proximity determining system 10 of FIG. 11 operates in the containment mode of operation, the transmitting antenna 34 defines the boundary within which the animal is contained. Additionally, when the receiver unit 14 does not detect the signal 16, it determines that the animal is within the fourth zone 62 and does not activate the audible stimulus generator 52 or the electrical stimulus generator 54. When the decoder module 50 decodes both the first encoded data word 22 and the second encoded data word 24 at a bit error rate of greater than zero, the decoder module 50 determines that the animal is within the third zone 60 and does not activate the audible stimulus generator 52 or the electrical stimulus generator 54. When the decoder module 50 decodes the first encoded data word 22 at a bit error rate of zero but decodes the second encoded data word 24 at a bit error rate of greater than zero, the decoder module 50 determines that the animal is within the second zone 58 and activates the audible stimulus generator 52, which delivers an audible stimulus to the animal, warning the animal to return to the third zone 60. When the decoder module 50 decodes the first encoded data word 22 at a bit error rate of zero and decodes the second encoded data word 24 at a bit error rate of zero, the decoder module 50 determines that the animal is within the first zone 56 and activates the electrical stimulus generator 54, which delivers an electrical stimulus to the animal, correcting the animal for being less than a distance $D_1$ from the transmitting antenna 34. Consequently, the antenna proximity determining system 10 contains the animal within the boundary defined by the transmitting antenna 34 by correcting the animal when it approaches the boundary.

When the antenna proximity determining system 10 of FIG. 11 operates in the exclusion mode of operation, the transmitting antenna 34 defines an area from which the animal is to be excluded, such as a flower garden. Accordingly, when the decoder module 50 decodes both the first encoded data word 22 and the second encoded data word 24 at a bit error rate of greater than zero, the decoder module 50 determines that the animal is within the third zone 60 and does not activate the audible stimulus generator 52 or the electrical stimulus generator 54. When the decoder module 50 decodes the first encoded data word 22 at a bit error rate of zero but decodes the second encoded data word 24 at a bit error rate of greater than zero, the decoder module 50 determines that the animal is within the second zone 58 and activates the audible stimulus generator 52, which delivers an audible stimulus to the animal, warning the animal to return to the third zone 60. When the decoder module 50 decodes the first encoded data word 22 at a bit error rate of zero and decodes the second encoded data word 24 at a bit error rate of zero, the decoder module 50 determines that the animal is within the first zone 56 and activates the electrical stimulus generator 54, which delivers an electrical stimulus to the animal, correcting the animal for being less than a distance $D_1$ from the transmitting antenna 34, which defines, for example, the flower garden. Consequently, the antenna proximity determining system 10 discourages the animal from approaching the transmitting antenna 34, and incidentally, for example, the flower garden.

The zones 56-62 and the distances $D_1$-$D_3$ of FIG. 11 are defined in accordance with the above calculations corresponding to the embodiment of the antenna proximity determining system 10 where the transmitting antenna 34 is a three-coil antenna array except the current, i, which is driven through the single wire, required to generate the requisite magnetic field strength is calculated as follows.

$$i = \frac{2\pi Bx}{\mu_0}$$

It should be noted that the stimulus scheme utilized by the antenna proximity determining system 10 can vary from those discussed in accordance with the illustrated embodiments without departing from the scope and spirit of the present invention. For example, stimuli other than the audible stimulus and the electrical stimulus can be used without departing from the scope or spirit of the present invention. Additionally, a single stimulus, such as the electrical stimulus, can be used such that no warning stimulus, such as the audible stimulus, is used without departing from the scope or spirit of the present invention. Additionally, the intensities of the employed stimuli can vary without departing from the scope or spirit of the present invention.

It should also be noted that the receiver unit 14 can be limited to responsive communication with a particular transmitter unit 12. More specifically, the signal 16 may include, for example, a transmitter unit 12 code such that the receiver unit 14 does not respond to a signal transmitted by the transmitter unit of another system. Consequently, the receiver unit 14 does not deliver a stimulus to the animal when the animal is within an acceptable zone and the signal from another system is detected by the receiver unit 14. Additionally, the animal is not trapped when the animal strays into another system.

Figure 12:
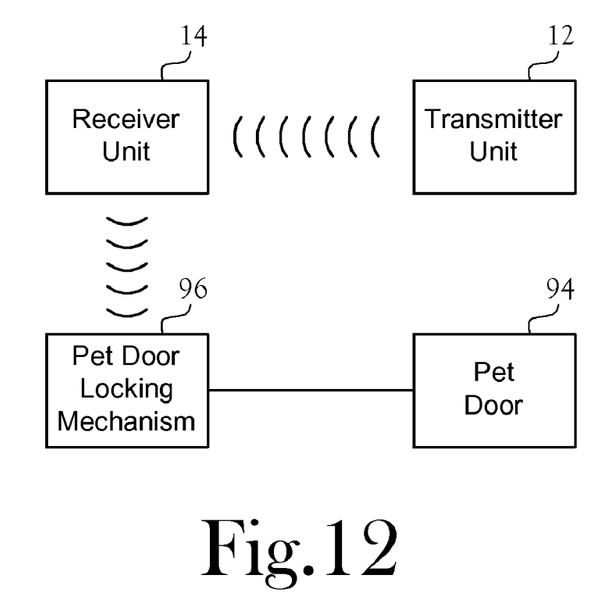
FIG. 12 is a block diagram of one embodiment of the antenna proximity determining system providing a selective access pet door.
Figure 13:
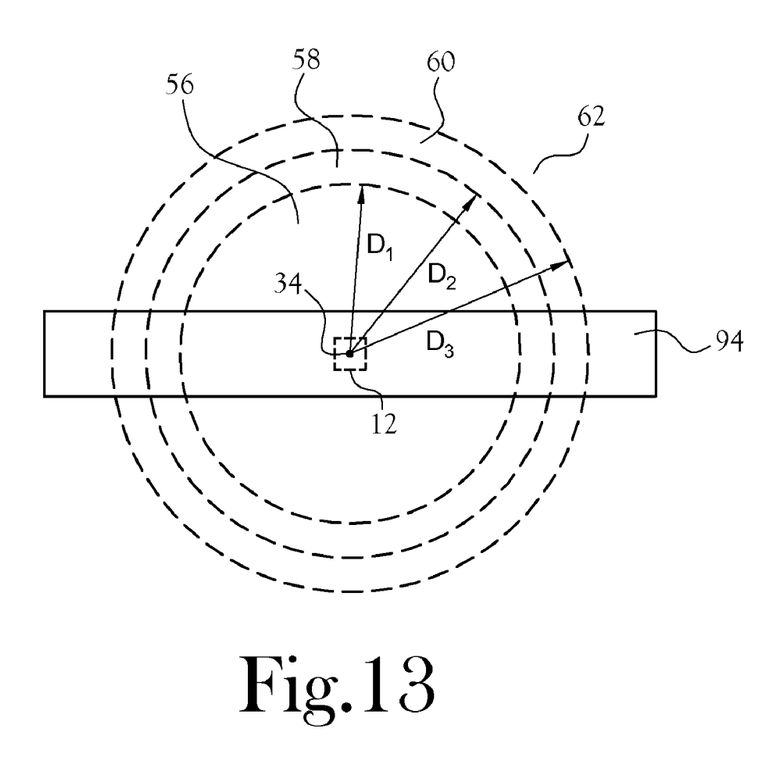
FIG. 13 illustrates one embodiment of the selective access pet door of the antenna proximity determining system of FIG. 12.

FIG. 12 illustrates another embodiment of the antenna proximity determining system 10 in accordance with the various features of the present invention. In the illustrated embodiment, the receiver unit 14 is in wireless communication with a pet door locking mechanism 96, which is in mechanical communication with a pet door 94. Additionally, the transmitting antenna 34 is the three-coil antenna array of FIG. 3 and is disposed proximate to the pet door 94, as illustrated at FIG. 13. Additionally, as illustrated at FIG. 13, the first zone 56, the second zone 58, the third zone 60, and the fourth zone 62 are defined in accordance with the above discussion. It should be noted that the wireless communication between the receiver unit 14 and the pet door locking mechanism 96 includes the transmission and reception of any wireless signal, such as an audible tone or a radio frequency signal.

The receiver unit 14 determines which zone it is located within in accordance with above discussion. When the receiver unit 14 determines that it is within the first zone 56, the receiver unit 14 indicates such to the pet door locking mechanism 96, which unlocks the pet door 94, providing the animal access to the pet door. After the receiver unit 14 has determined that it is within the first zone 56, when the receiver unit 14 determines that it is within the third zone 60, the receiver unit 14 indicates such to the pet door locking mechanism 96, which locks the pet door 94, denying another animal access to the pet door 94. Consequently, after the animal approaches the pet door 94 to the extent that the pet door locking mechanism 96 unlocks the pet door 94, the pet door locking mechanism 96 locks the pet door 94 when the animal distances itself at least a distance $D_2$ from the pet door 94, regardless of whether the animal actually accessed the pet door 94. As a result, the antenna proximity determining system 10 of FIGS. 12 and 13 provides a pet door that provides selectable access.

Those skilled in the art will recognize that the receiver unit 14 can be within a zone other than the first zone 56 to unlock the pet door 94 without departing from the scope or spirit of the present invention. Additionally, those skilled in the art will recognize that after unlocking the pet door 94, the receiver unit 14 can be within a zone other than the third zone 60 to lock the pet door 94 without departing from the scope or spirit of the present invention. Those skilled in the art will also recognize that the pet door 94 can lock automatically after a predetermined time period beginning when the pet door 94 is unlocked.

From the foregoing description, those skilled in the art will recognize that an antenna proximity determining system for containing an animal within or excluding an animal from a defined area offering advantages over the prior art has been provided. The antenna proximity determining system defines a plurality a zones and determines which of the plurality of zones the animal is within based on the bit error rate of a signal received at the current location of the animal. The antenna proximity determining system delivers a stimulus to the animal based on the zone the animal is within.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An antenna proximity determining system, said antenna proximity determining system comprising:
    a transmitter unit including a transmitting antenna, said transmitter unit generating a digital signal including at least one data word encoded using forward error correction coding, said transmitter unit transmitting the digital signal by way of the transmitting antenna such that the digital signal is an attenuating field radiating from the transmitting antenna, each of the at least one data word being transmitted at a respective data transmission rate, the digital signal indicating the respective data transmission rate corresponding to each of the at least one data word; and
    a receiver unit adapted to be carried by the animal, said receiver unit receiving the digital signal, decoding the at least one data word, and noting the respective number of bit errors detected for each of the at least one data word, the respective number of bit errors detected for each of the at least one data word and the respective data transmission rate corresponding to each of the at least one data word defining a plurality of zones, said receiver unit delivering a stimulus to the animal when the receiver unit is within at least one of the plurality of zones.

2. The antenna proximity determining system of claim 1 wherein the transmitting antenna includes at least one coil.

3. The antenna proximity determining system of claim 1 wherein the transmitting antenna includes a single wire that defines a boundary.

4. The antenna proximity determining system of claim 1 wherein the digital signal includes a first data word and a second data word, the first data word being transmitted at a low data transmission rate, the second data word being transmitted at a high data transmission rate, whereby the high data transmission rate is faster than the low data transmission rate.

5. The antenna proximity determining system of claim 4 wherein the respective number of bit errors detected for the first data word and the second data word and the respective data transmission rate corresponding to the first data word and the second data word define a first zone, a second zone, a third zone, and a fourth zone.

6. The antenna proximity determining system of claim 1 wherein the digital signal includes a first data word, a second data word, a third data word, and a fourth data word, the first data word and the second data word being transmitted at a low data transmission rate, the third data word and the fourth data word being transmitted at a high data transmission rate, whereby the high data transmission rate is faster than the low data transmission rate.

7. The antenna proximity determining system of claim 6 wherein the respective number of bit errors detected for the first data word, the second data word, the third data word, and the fourth data word and the respective data transmission rate corresponding to the first data word, the second data word, the third data word, and the fourth data word define a first zone, a second zone, a third zone, and a fourth zone.

8. The antenna proximity determining system of claim 1 wherein the digital signal includes a first data word, a second data word, and a third data word, the first data word being transmitted at a first data transmission rate, the second data word being transmitted at a second data transmission rate, the third data word being transmitted at a third data transmission rate, whereby the first data transmission rate is slower than the second data transmission rate, which is slower than the third data transmission rate.

9. The antenna proximity determining system of claim 8 wherein the respective number of bit errors detected for the first data word, the second data word, and the third data word and the respective data transmission rate corresponding to the first data word, the second data word, and the third data word define a first zone, a second zone, a third zone, a fourth zone, and a fifth zone.

10. The antenna proximity determining system of claim 1 wherein the digital signal includes a sync word.

11. The antenna proximity determining system of claim 10 wherein the sync word precedes the at least one data word within the digital signal.

12. The antenna proximity determining system of claim 11 wherein the sync word indicates the respective data transmission rate corresponding to each of the at least one data word.

13. The antenna proximity determining system of claim 10 wherein the sync word indicates the current mode of operation of said antenna proximity determining system.

14. The antenna proximity determining system of claim 10 wherein the sync word indicates the current stimulus scheme employed by said antenna proximity determining system.

15. The antenna proximity determining system of claim 1 wherein the digital signal includes a preamble.

16. The antenna proximity determining system of claim 1 wherein said receiver unit calculates a bit error rate over a period of time, whereby said receiver unit receives multiple digital signals within the period of time.

17. The antenna proximity determining system of claim 1 wherein the at least one data word is encoded using a Bose-Chaudhuri-Hocquenghem (15,7,1) algorithm.

18. An antenna proximity determining system, said antenna proximity determining system comprising:
 a transmitter unit including a signal generator, a signal modulator, and a transmitting antenna, the signal generator being in electrical communication with the signal modulator, the signal modulator being in electrical communication with the transmitting antenna, the signal generator generating a digital signal that includes at least one data word encoded using forward error correction coding, the signal modulator generating a modulated digital signal by modulating a carrier signal with the digital signal, the transmitting antenna wirelessly transmitting the modulated digital signal, each of the at least one data word being transmitted at a respective data transmission rate, the digital signal indicating the respective data transmission rate corresponding to each of the at least one data word; and
 a receiver unit including a receiving antenna, a demodulator module, a decoder module, and at least one stimulus generator, the receiving antenna being in electrical communication with the demodulator module, the demodulator module being in electrical communication with the decoder module, the decoder module being in electrical communication with the at least one stimulus generator, the receiving antenna being responsive to the modulated digital signal to the extent that the demodulator module receives the modulated digital signal, the demodulator module demodulates the modulated digital signal such that the decoder module receives the digital signal, the decoder module decodes the at least one data word and notes the respective number of bit errors detected for each of the at least one data word, the respective data transmission rate corresponding to each of the at least one data word and the respective number of bit error detected for each of the at least one data word defining a plurality of zones, the decoder module activating one of the at least one stimulus generator when the respective data transmission rate corresponding to each of the at least one data word and the respective number of bit errors detected for each of the at least one data word indicate that the receiver unit is within at least one of the plurality of zones, the at least one stimulus generator delivering a stimulus to the animal when activated.

19. The antenna proximity determining system of claim 18 wherein the transmitting antenna includes at least one coil.

20. The antenna proximity determining system of claim 18 wherein the transmitting antenna includes a single wire that defines a boundary.

21. The antenna proximity determining system of claim 18 wherein the signal modulator modulates the digital signal using frequency modulation.

22. The antenna proximity determining system of claim 21 wherein the signal modulator modulates the digital signal using frequency shift keying.

23. The antenna proximity determining system of claim 18 wherein the digital signal induces a voltage across the receiving antenna.

24. The antenna proximity determining system of claim 18 wherein the at least one data word includes a first data word and a second data word, the first data word being transmitted at a first data transmission rate and the second data word being transmitted at a second data transmission rate, the first data transmission rate being slower than the second data transmission rate.

25. The antenna proximity determining system of claim 24 wherein the at least one stimulus generator includes a first stimulus generator and a second stimulus generator.

26. The antenna proximity determining system of claim 25 wherein the decoder module does not activate the at least one stimulus generator when the number of bit errors detected for the first data word is zero and the number of bit errors detected for the second data word is zero, the decoder module activates the first stimulus generator when the number of bit errors detected for the first data word is zero and the number of bit errors detected for the second data word is greater than zero, the decoder module activates the second stimulus generator when the number of bit errors detected for the first data word is greater than zero and the number of bit errors detected for the second data word is greater than zero, the decoder module does not activate the at least one stimulus generator when the receiving antenna does not respond to the digital signal.

27. The antenna proximity determining system of claim 25 wherein the decoder module does not activate the at least one stimulus generator when the receiving antenna does not respond to the digital signal, the decoder module does not activate the at least one stimulus generator when the number of bit errors detected for the first data word is greater than zero and the number of bit errors detected for the second data word is greater than zero, the decoder module activates the first stimulus generator when the number of bit errors detected for the first data word is zero and the number of bit errors detected for the second data word is greater than zero, the decoder module activates the second stimulus generator when the number of bit errors detected for the first data word is zero and the number of bit errors detected for the second data word is zero.

28. The antenna proximity determining system of claim 25 wherein the first stimulus generator delivers a warning stimulus to the animal.

29. The antenna proximity determining system of claim 28 wherein the first stimulus generator delivers an audible stimulus to the animal.

30. The antenna proximity determining system of claim 25 wherein the second stimulus generator delivers a correction stimulus to the animal.

31. The antenna proximity determining system of claim 30 wherein the second stimulus generator delivers an electrical stimulus to the animal.

32. The antenna proximity determining system of claim 24 wherein the respective number of bit errors detected for the first data word and the second data word and the respective data transmission rate corresponding to the first data word and the second data word define a first zone, a second zone, a third zone, and a fourth zone.

33. The antenna proximity determining system of claim 32 wherein the at least one stimulus generator includes a first stimulus generator and a second stimulus generator.

34. The antenna proximity determining system of claim 33 wherein the decoder module does not activate the at least one stimulus generator when the receiver unit is within the first zone, the decoder module activates the first stimulus generator when the receiver unit is within the second zone, the decoder module activates the second stimulus generator when the receiver unit is within the third zone.

35. The antenna proximity determining system of claim 33 wherein the decoder module does not activate the at least one stimulus generator when the receiver unit is within the third zone, the decoder module activates the first stimulus generator when the receiver unit is in the second zone, the decoder module activates the second stimulus generator when the receiver unit is within the first zone.

36. An antenna proximity determining system, said antenna proximity determining system comprising:
a transmitter unit generating a digital signal, the digital signal including a sync word, a first data word, and a second data word, the sync word indicating the respective data transmission rate corresponding the first data word and the second data word, the sync word preceding the first data word and the second data word within the digital signal, the first data word preceding the second data word within the digital signal, said transmitter unit encoding the first data word and the second data word using forward error correction coding, said transmitter unit transmitting the sync word and the first data word at a low data transmission rate, said transmitter unit transmitting the second data word at a high data transmission rate, said transmitter unit wirelessly transmitting the digital signal as an attenuating field; and
a receiver unit adapted to be carried by the animal, said receiver unit receiving and detecting the digital signal, said receiver unit decoding the first data word and noting the number of detected bit errors associated with the first data word, said receiver unit decoding the second data word and noting the number of detected bit errors associated with the second data word, said receiver unit not delivering a stimulus to the animal when the number of detected bit errors associated with the first data word is zero and the number of detected bit errors associated with the second data word is zero, said receiver unit delivering a first stimulus to the animal when the number of detected bit errors associated with the first data word is zero and the number of detected bit errors associated with the second data word is greater than zero, said receiver unit delivering a second stimulus to the animal when the number of detected bit errors associated with the first data word is greater than zero and the number of detected bit errors associated with the seconded data word is greater than zero.

37. The antenna proximity determining system of claim 36 wherein said receiver unit detects the digital signal by matching the sync word with a valid word stored at said receiver unit.

38. The antenna proximity determining system of claim 36 wherein the sync word indicates the definition of the first stimulus and the second stimulus.

39. The antenna proximity determining system of claim 36 wherein the first stimulus is defined as a warning stimulus.

40. The antenna proximity determining system of claim 39 wherein the first stimulus is defined as an audible stimulus.

41. The antenna proximity determining system of claim 36 wherein the second stimulus is defined as a correction stimulus.

42. The antenna proximity determining system of claim 41 wherein the second stimulus is defined as an electrical stimulus.

43. The antenna proximity determining system of claim 36 wherein said receiver unit does not deliver a stimulus to the animal when the receiver unit does not detect the digital signal.

44. An antenna proximity determining system, said antenna proximity determining system comprising:
a transmitter unit generating a digital signal, the digital signal including a sync word, a first data word, and a second data word, the sync word indicating the respective data transmission rate corresponding the first data word and the second data word, the sync word preceding the first data word and the second data word within the digital signal, the first data word preceding the second data word within the digital signal, said transmitter unit encoding the first data word and the second data word using forward error correction coding, said transmitter unit transmitting the sync word and the first data word at a low data transmission rate, said transmitter unit transmitting the second data word at a high data transmission rate, said transmitter unit wirelessly transmitting the digital signal as an attenuating field; and
a receiver unit adapted to be carried by the animal, said receiver unit receiving and detecting the digital signal, said receiver unit decoding the first data word and noting the number of detected bit errors associated with the first data word, said receiver unit decoding the second data word and noting the number of detected bit errors associated with the second data word, said receiver unit not delivering a stimulus to the animal when the number of detected bit errors associated with the first data word is greater than zero and the number of detected bit errors associated with the second data word is greater than zero, said receiver unit delivering a first stimulus to the animal when the number of detected bit errors associated with the first data word is zero and the number of detected bit errors associated with the second data word is greater than zero, said receiver unit delivering a second stimulus to the animal when the number of detected bit errors associated with the first data word is zero and the number of detected bit errors associated with the second data word is zero.

45. The antenna proximity determining system of claim 44 wherein said receiver unit detects the digital signal by matching the sync word with a valid word stored at said receiver unit.

46. The antenna proximity determining system of claim 44 wherein the sync word indicates the definition of the first stimulus and the second stimulus.

47. The antenna proximity determining system of claim 44 wherein the first stimulus is defined as a warning stimulus.

48. The antenna proximity determining system of claim 47 wherein the first stimulus is defined as an audible stimulus.

49. The antenna proximity determining system of claim 44 wherein the second stimulus is defined as a correction stimulus.

50. The antenna proximity determining system of claim 49 wherein the second stimulus is defined as an electrical stimulus.

51. The antenna proximity determining system of claim 44 wherein said receiver unit does not deliver a stimulus to the animal when the receiver unit does not detect the digital signal.

* * * * *